(12) United States Patent
Huh et al.

(10) Patent No.: US 12,708,500 B2
(45) Date of Patent: Aug. 18, 2026

(54) ASSEMBLY TYPE ROD FOR RECORDING OCCLUSAL PLANE

(71) Applicant: Pusan National University Industry-University Cooperation Foundation, Busan (KR)

(72) Inventors: Jung bo Huh, Busan (KR); Sohyoun Lee, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 694 days.

(21) Appl. No.: 17/295,813

(22) PCT Filed: Nov. 20, 2019

(86) PCT No.: PCT/KR2019/015925
§ 371 (c)(1),
(2) Date: May 20, 2021

(87) PCT Pub. No.: WO2020/130374
PCT Pub. Date: Jun. 25, 2020

(65) Prior Publication Data

US 2022/0023021 A1 Jan. 27, 2022

(30) Foreign Application Priority Data

Dec. 18, 2018 (KR) ........................ 10-2018-0164499

(51) Int. Cl.
*A61C 19/05* (2006.01)
*A61C 9/00* (2006.01)

(52) U.S. Cl.
CPC ............ *A61C 19/05* (2013.01); *A61C 9/0006* (2013.01)

(58) Field of Classification Search
CPC ..... A61C 19/052; A61C 19/055; A61C 19/04; A61C 19/05; A61C 19/045; A61C 19/0006
See application file for complete search history.

(56) References Cited

U.S. PATENT DOCUMENTS 1,703,105 A * 2/1929 Hawksworth ........ A61C 19/045 33/513
3,577,855 A * 5/1971 Baum ...................... A61C 9/00 33/514

(Continued)

FOREIGN PATENT DOCUMENTS

CN 2149186 Y 12/1993
CN 1972641 A 5/2007

(Continued)

OTHER PUBLICATIONS

WO 2014109516 machien translation (Year: 2014).*

(Continued)

*Primary Examiner* — Heidi M Eide
*Assistant Examiner* — Courtney N Huynh
(74) *Attorney, Agent, or Firm* — CHRISTENSEN O'CONNOR JOHNSON KINDNESS PLLC

(57) ABSTRACT

An assembly type rod for an occlusal plane taking is presented. An assembly type rod according to one embodiment comprises: a bite rod of which the middle portion thereof is placed between the upper and lower anterior teeth of a patient to obtain information of the frontal occlusal plane parallel to the interpupillary line; and an extension portion which is coupled to the bite rod in the form of a ball-and-socket through a ball-shaped coupling portion and is rotatable in a state of being coupled with the bite rod such that information of a lateral occlusal plane according to Camper's line on both sides can be acquired.

4 Claims, 14 Drawing Sheets

(56) References Cited

U.S. PATENT DOCUMENTS

| | | | | | |
|---|---|---|---|---|---|
| 3,854,208 | A * | 12/1974 | Arant | A61C 19/045 | 433/73 |
| 4,242,087 | A * | 12/1980 | Lee | A61C 19/045 | 433/68 |
| 7,601,000 | B1 * | 10/2009 | Hammond | A61C 19/055 | 433/68 |
| 9,517,116 | B2 * | 12/2016 | Filtchev | A61C 19/045 | |
| 2006/0160044 | A1 | 7/2006 | Olivier | | |
| 2008/0187882 | A1 * | 8/2008 | Margossian | A61C 19/045 | 433/68 |
| 2011/0136073 | A1 * | 6/2011 | Basta | A61C 19/04 | 433/73 |
| 2015/0147726 | A1 * | 5/2015 | Filtchev | A61C 1/0015 | 433/213 |
| 2017/0165042 | A1 * | 6/2017 | Hillukka | A61B 5/682 | |
| 2019/0290411 | A1 * | 9/2019 | Olivier | A61C 19/05 | |

FOREIGN PATENT DOCUMENTS

| | | | | | |
|---|---|---|---|---|---|
| DE | 10007368 | A1 | | 2/2000 | |
| FR | 1378727 | A | * | 11/1964 | A61C 11/02 |
| JP | 4214419 | B2 | | 1/2009 | |
| JP | 2016-504083 | B2 | | 2/2016 | |
| KR | 2017124135 | A | * | 11/2017 | A61C 19/04 |
| KR | 20170124135 | A | * | 11/2017 | A61C 19/05 |
| KR | 1020170124135 | A | | 11/2017 | |
| KR | 101825894 | B1 | | 2/2018 | |
| KR | 101909829 | A | | 10/2018 | |
| KR | 101909829 | B1 | * | 10/2018 | A61C 19/05 |
| WO | WO-2014109516 | A1 | * | 7/2014 | A61C 19/05 |

OTHER PUBLICATIONS

FR 1378727 A (Heydenreich) Device usable in dentistry to take exact measurements of the functional movements of the jawbones and articulator allowing these measurements to be reproduced for the making of prosthetic devices, Nov. 13, 1964 [retrieved May 20, 2025]. Translation: Google Translate, Espacenet (Year: 1964).*

WO-2014109516-A1 (Lee Chae-Bung; An Yinghong) Dental Facebow, Jul. 17, 2014 [retrieved on Nov. 25, 2024]. Translation retrieved from: Espacenet (Year: 2014).*

KR-2017124135-A (Han Hyung Ryeol; Ahn Yong Gook; Han In Hae; Han Sung Woong; Song Jeong Gi; Back Hyun Young ) Apparartus for measuring maxillofacial asymmetry, Nov. 10, 2017 [retrieved on Nov. 25, 2024]. Translation retrieved from: Google Translate (Year: 2017).*

KR 101909829 B1 (Kim O Bong) Dental Face Bow, Oct. 18, 2018 [retrieved on Sep. 25, 2025]. Translation retrieved from: Espacenet (Year: 2018).*

International Search Report mailed Feb. 21, 2020, issued in corresponding Application No. PCT/KR2019/015925, filed Nov. 20, 2019, 2 pages.

Extended European Search Report mailed Jan. 4, 2022, issued in corresponding International Application No. PCT/KR2019/015925, filed Nov. 20, 2019, 7 pages.

Office Action mailed Dec. 28, 2021, issued in corresponding Chinese Application No. 201980077254.4, 7 pages.

Office Action issued May 25, 2022 in corresponding Japanese Application No. 2021-529084, 3 pages.

* cited by examiner

PRIOR ART

ASSEMBLY TYPE ROD FOR RECORDING OCCLUSAL PLANE

TECHNICAL FIELD

The following embodiments relate to an assembly type rod for occlusal plane taking, and more particularly, to an assembly type rod for occlusal plane taking, wherein a simple device can be easily used.

BACKGROUND ART

In a dental clinic, in order to fabricate a dental prosthesis, a process of reproducing an intraoral environment of a patient as a model and moving it to an articulator is essential. To this end, it is very important to take an impression within the oral cavity of the patient and accurately transfer information of the patient to a dental technician who has to fabricate a dental prosthesis in a dental laboratory. At this time, one of pieces of patient information that need to be considered most importantly is an occlusal plane. In this case, the occlusal plane means planes connected based on points at which the teeth of a maxillary and a mandibular are engaged. In order to set a correct occlusal plane, anterior and posterior (frontal, lateral) reference planes indicated as anatomical landmarks, such as eyes, ears, or a nose, are used.

First, in order to fabricate an intraoral environment of a patient as a model, a mixed impression material is placed within a frame called a "tray" of a dental arch form. An impression of the patient based on a dentition of the maxillary or the mandibular is taken. A maxillary tray has a form that covers a palate, whereas a mandibular tray has an arch form in which a space where a tongue is placed is considered. The results of impression taking called "impression body" are not directly used for dental treatment because it is a negative form. Actually, a dental model having a positive form is fabricated and used by pouring gypsum, etc. into the Impression body. In order to move the fabricated dental model having a positive form to an articulator for fabricating a prosthesis, various reference planes need to be set. Conventionally, to this end, a microbrush, a swab, a face bow, etc. is simply used.

However, the conventional method has several problems in that inaccurate information is frequently delivered to a dental technician because a model in which an occlusal plane is not considered is fabricated, a microbrush, a swab, etc. having a simple rod form is likely to be deformed, it is difficult to provide information on an accurate occlusal plane because only a reference line at the frontal view can be set, a method using a face bow, etc. is complicated because the face bow is expensive equipment, only a dedicated articulator according to a manufacturing company can be used, and inaccurate information on an occlusal plane may be delivered if anatomical landmark, such as eyes or ears, are asymmetrical.

Korean Patent No. 10-1825894 relates to such a zig type dental articulator simulating rotational movement of median-axial joint, and describes a technology related to a device used to simulate a dental prosthesis in the state in which a teeth model has been formed by mounting a maxillary model and a mandibular model on an articulator.

DISCLOSURE

Technical Problem

Embodiments are described in relation to an assembly type rod for occlusal plane taking, and more specifically, provide a technology related to reproduce the necessary reference lines through a simple device without deformation and easily used.

Embodiments provide an assembly type rod for occlusal plane taking, which simultaneously takes an interpupillary line, that is, a reference line viewed from the frontal side, and Camper's lines, that is, reference lines on the lateral side.

Technical Solution

An assembly type rod according to an embodiment includes a front bite rod that places a middle part between the maxillary and mandibular anterior teeth of a user. A frontal occlusal plane may be measured by obtaining plane information parallel to the interpupillary line of the user through the bite rod.

The bite rod is coupled to a maxillary tray or a mandibular tray, and may measure the occlusal plane simultaneously with impression taking, The bite rod Includes an adhesion part in which adhesives are coated on the middle part. The adhesives are molten by applying heat to the adhesion part, so that the bite rod may be attached and fixed to the maxillary or the mandibular tray.

The assembly type rod may further include an indicating box having a "L"-shape and inserted and fixed to a coupling plate configured in the middle part of the bite rod, wherein a stick part is coupled to the upper end of the indicating box and Indicates a midline.

The assembly type rod may further include a bite part coupled to the bite rod and configured so that the anterior teeth of the user are seated and fixed to the bite part.

The bite part is formed in a "⊏"-shape with an open outside, so that the bite rod may be inserted and fixed to the bite part through the open portion.

The bite rod includes an adhesion part in which adhesives are coated on the middle part. The adhesives are molten by applying heat to the adhesion part, so that the bit rod may be Inserted and fixed to the open portion of the bite part.

The assembly type rod may further include extension parts coupled to both ends of the bite rod and extended in parallel to a line that connects the ala of a nose of the user and the middles of ears of the user on both sides in order to obtain information on Camper's lines.

The extension parts include ball-shaped coupling parts, respectively, and coupled to the bite rod through the ball-shaped coupling parts in a ball & socket form. The extension parts may be rotated in the state in which the extension parts have been coupled to the bite rod, and may be matched and fixed in parallel to the Camper's lines on both sides.

The bite rod may be coupled to or separated from the extension parts through the coupling parts.

The bite rod may include a scale part which enables the length of anatomical landmarks to be checked when a fixed or removable prosthesis is fabricated.

Advantageous Effects

According to embodiments, there can be provided the assembly type rod for occlusal plane taking, which can simultaneously take the interpupillary line, that is, a reference line viewed from the frontal side, and the Camper's line, that is, a reference line on the lateral side, in addition to the midline and the symmetry of arches.

According to embodiments, there can be provided the assembly type rod for occlusal plane taking, which is capable of impression taking and simultaneously an occlusal plane transferring without expensive equipment and an Inconvenient additional work to improve a complicated clinical technique or an inconvenient bite taking method.

DESCRIPTION OF DRAWINGS

FIG. 9 is a diagram for describing an assembly type rod coupled to a lower conventional metal impression tray according to an embodiment.

BEST MODE FOR INVENTION

Figure 1:
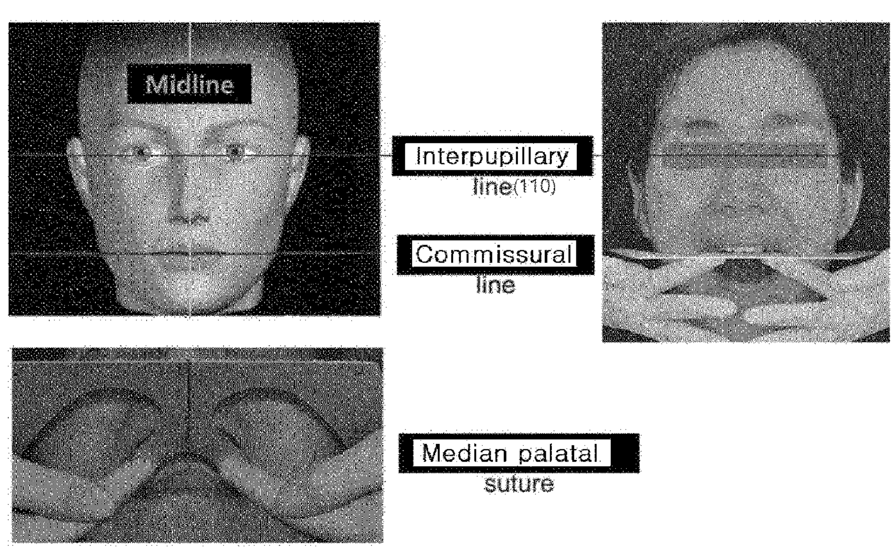
FIG. 1 is a diagram for describing the frontal reference of a common occlusal plane.

Hereinafter, embodiments are described in detail with reference to the accompanying drawings. However, the described embodiments may be modified in various other forms, and the scope of the present disclosure is not limited to the following embodiments. Several embodiments are provided to describe the present disclosure (invention) more professionally to a person with ordinary knowledge in the dental field. Accordingly, the shapes, sizes, etc. of elements in the drawings may be exaggerated to make the description clear.

In general, an occlusal plane follows a line that connects pupils on both sides when viewed from the frontal side, and follows a line that connects the tragus of an ear and an ala of nose when viewed from the lateral side.

FIG. 1 is a diagram for describing the frontal reference of a common occlusal plane.

Referring to FIG. 1, the frontal reference of the occlusal plane follows an interpupillary line 110. In this case, the interpupillary line 110 means a line that connects the middle points of pupils on both sides.

Figure 2:
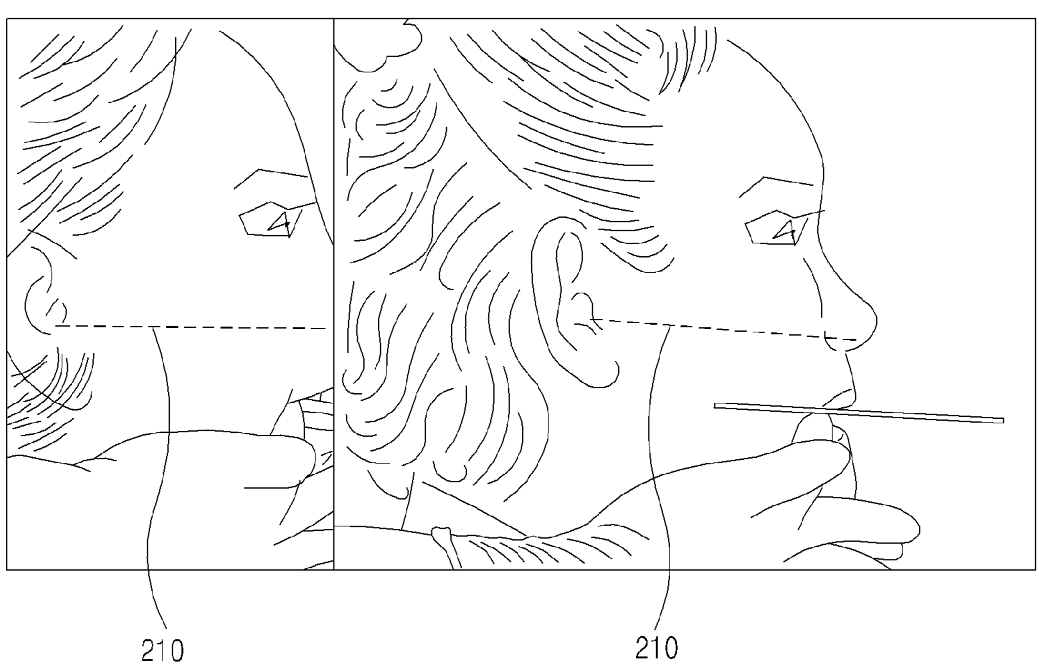
FIG. 2 is a diagram for describing the lateral reference of a common occlusal plane.

FIG. 2 is a diagram for describing the lateral reference of a common occlusal plane.

Referring to FIG. 2, the lateral reference of the occlusal plane follows a line that connects the tragus of an ear and the ala of nose on average. In general, the occlusal plane follows a Camper's line 210 when viewed from the lateral side. In this case, the Camper's line 210 means a line that connects the tragus of an ear and the ala of nose.

Various methods have been used to transfer the occlusal plane from the oral cavity to the model. The most representative method is to use a face bow, that is, a part of an articulator device along with taking occlusal surface of maxillary and mandibular teeth. In the case of edentulous area without teeth, an occlusal rim made of wax is additionally required by the dentist.

Figure 3:
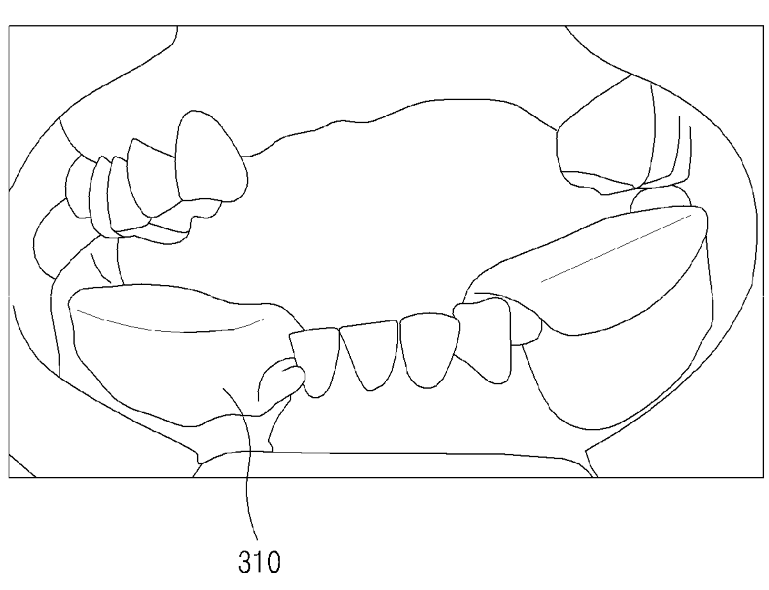
FIG. 3 is a diagram Illustrating the existing occlusal rim which is randomly made and used by a dentist.

FIG. 3 is a diagram illustrating the conventional occlusal rim 310 made of wax and used by a dentist. The occlusal rim is fabricated on a model in which an impression is previously taken. When a model in which an occlusal plane is not considered is fabricated, a form of an occlusal rim is poor. Accordingly, in order to correct the poor form, a lot of an unnecessary time is taken. When using a face bow to transfer the occlusal plane information to extraoral condition, the possibility of an error is increased.

Figure 4:
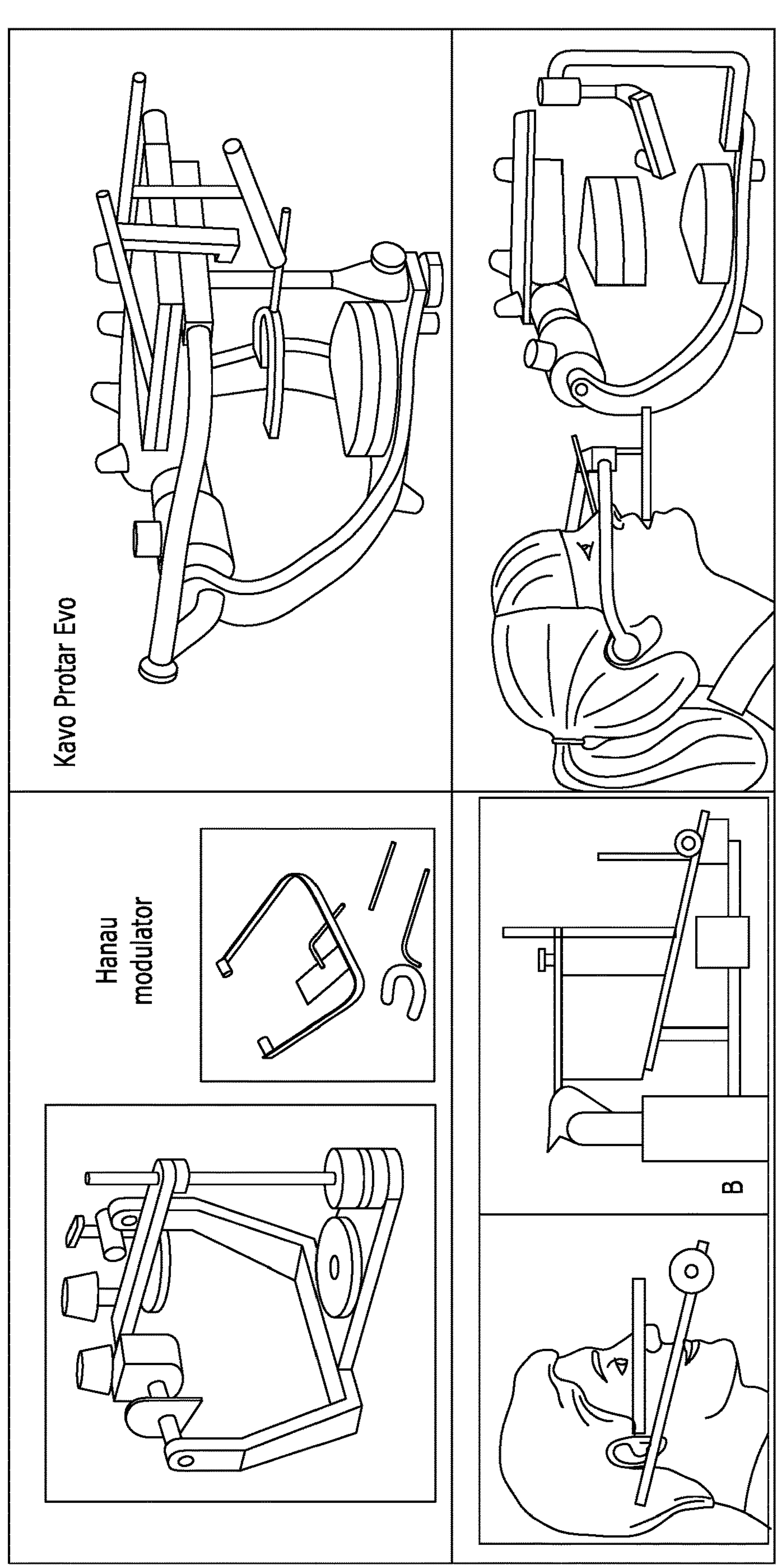
FIG. 4 is a diagram illustrating an example of the conventional semi-articulator.

FIG. 4 is a diagram illustrating an example of the conventional articulator.

As illustrated in FIG. 4, the conventional articulator is a device capable of taking the locations of an occlusal plane and a condyle and reproducing a jaw exercise. The occlusal plane of a patient is delivered to the articulator through a model by a face bow, that is, one of the functions of the device.

However, taking various types of information by using the articulator is necessary, but face bow is expensive and need complicated manipulation process. Therefore, in clinical practice, there has been a lot of demand for a simple and easy way to obtain accurate information of occlusal plane and an economical method.

The following embodiments relates to an assembly type rod for occlusal plane taking, which is not deformed, reproduces required reference lines through simple devices, and can be easily used.

Figure 5:
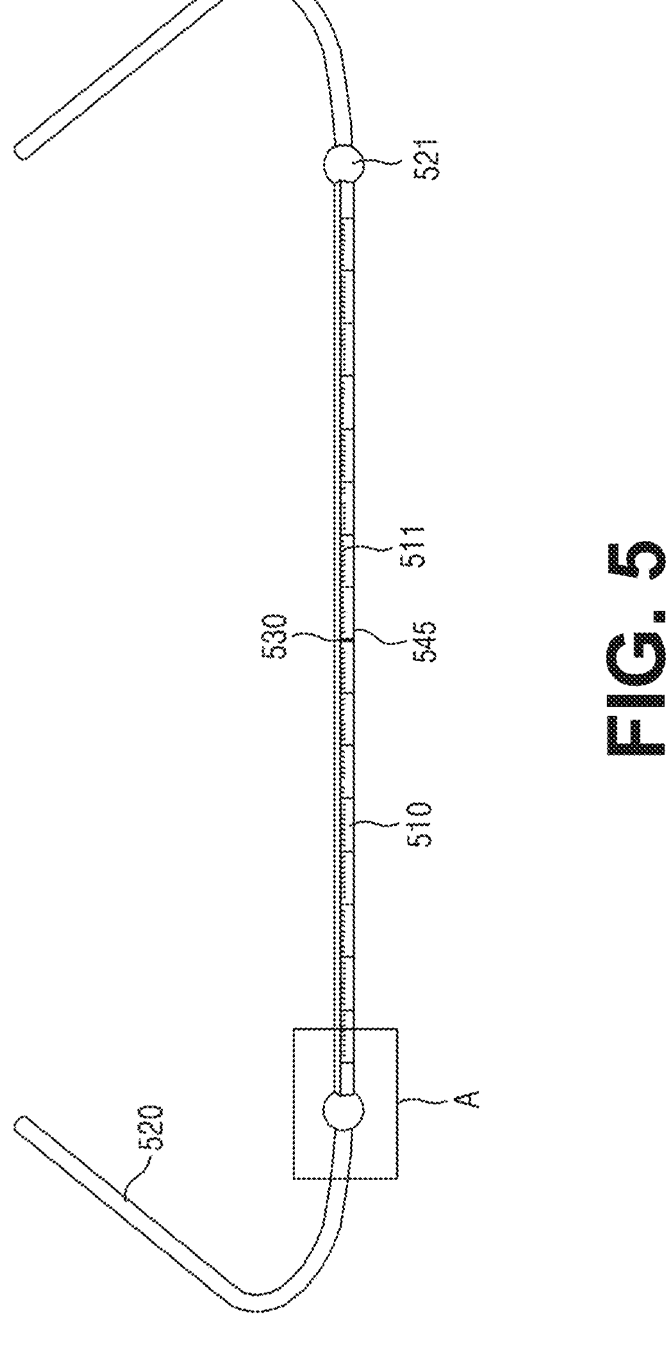
FIG. 5 is a diagram Illustrating an assembly type rod according to an embodiment.

FIG. 5 is a diagram illustrating an assembly type rod according to an embodiment.

Referring to FIG. 5, the assembly type rod 500 according to an embodiment may include a bite rod 510. Furthermore, according to an embodiment, the assembly type rod 500 may further include a bite part and extension parts 520.

The assembly type rod 500 is disposed in front of a user (patient), and the middle part 530 is placed between the maxillary and mandibular anterior teeth of the user. The bite rod 510 is adjusted to obtain information on the occlusal plane perpendicular to the midline, symmetrical to the arch form, and parallel to the interpupillary line.

A shape of the bite rod 510 is not limited, but the size of the bite rod 510 may have a horizontal length similar to the face of in a state positioned in the anterior teeth of a user. For example, the bite rod 510 may have a length of about 90 mm to 100 mm in order to check the interpupillary line. The bite rod 510 may be made of a plastic material, for example. In this case, the bite rod 510 is described as being made of a plastic material, but a material thereof is not limited.

A frontal occlusal plane may be measured by obtaining plane information parallel to the interpupillary line of a user through the bite rod 510.

Furthermore, the bite rod 510 is coupled to a maxillary tray or mandibular tray, and may simultaneously measure an occlusal plane with impression taking. In this case, an error for fabricating a subsequent prosthesis can be reduced because a model into which a correct occlusal plane has been reproduced can be fabricated. Specifically, upon taking of a preliminary impression or the final impression using a tray, if the bite rod 510 is used, the possibility of an error which may occur in an occlusal plane of a model can be reduced. It is very useful in taking a vertical dimension and centric relation of a patient essential for the fabrication of a prosthesis because an occlusal rim having a correct reference can be fabricated. In such a case, the bite rod 510 may include an adhesion part 545 in which adhesives are coated on the middle part 530. Accordingly, the adhesives may be molten by applying heat to the adhesion part, so that the bite rod 510 can be attached and fixed to the maxillary tray or the mandibular tray.

Furthermore, the bite rod 510 may further include a scale part 511. When a fixed or removable prosthesis (denture) is fabricated, the anatomical criteria for setting a form and length of teeth can be easily checked through the scale part 511.

Furthermore, a frontal occlusal plane, the midline of a face, and even the symmetry of arches can be checked using the bite rod 510. Accordingly, when the model is mounted on the articulator, an error with an actual oral condition can be reduced because information on a three-dimensional plane is provided.

Meanwhile, the assembly type rod 500 may further include a bite part at the back of the middle part 530 so that the anterior teeth of a user are seated and fixed. The bite part is located within a silicon bite material (bite registration material) squeezed into the maxillary and mandibular anterior teeth so that the bite rod 510 may be fixed while the silicon bite material is hardening.

The bite part is coupled to the middle part 530 of the bite rod 510, and may be configured so that the anterior teeth of the user are seated and fixed. For example, the bite part has a "L"-shaped form having an outside opened, so that the bite rod 510 may be inserted and fixed through the opened portion. Furthermore, the bite rod 510 includes an adhesion part in which adhesives are coated on the middle part 530, and may be inserted and fixed to the opened portion of the bite part through the adhesives molten by applying heat.

Furthermore, the assembly type rod 500 may further include the extension parts 520 coupled to both ends of the bite rod 510.

The extension parts 520 are disposed in the lateral side of the user, and are configured in plural number and may be coupled to both ends of the bite rod 510. The extension parts 520 may be adjusted parallel to a Camper's line that connects the ala of nose and tragus of the user. That is, the two extension parts 520 are placed to each other parallel in the direction of a line that connects the ala of nose and the tragus of ears of the user, so that information on the Camper's lines can be obtained.

The extension parts 520 include ball-shaped coupling parts 521, and may be coupled to the bite rod 510 through the ball-shaped coupling parts 521 in a ball & socket form. Accordingly, the extension parts 520 may be rotated in the state in which they are coupled to the bite rod 510 and can be fixed in accordance with the Camper's lines on both sides.

In this case, the bite rod 510 may be coupled to or separated from the extension parts 520 through the coupling parts 521. That is, after the bite rod 510 is separated from the extension parts 520, only the bite rod 510 may be used.

The Camper's line, the occlusal plane of the posterior teeth, may be reproduced through very simple devices to be connected on both sides of the bite rod 510.

Accordingly, the assembly type rod 500 according to embodiments can replace the conventional face bow in an economical and easy method, Because the assembly type rod can provide four-dimensional information of patient, including an interpupillary line of frontal view, Camper's lines of lateral view, a midline, and the symmetry of arches.

Figure 6:
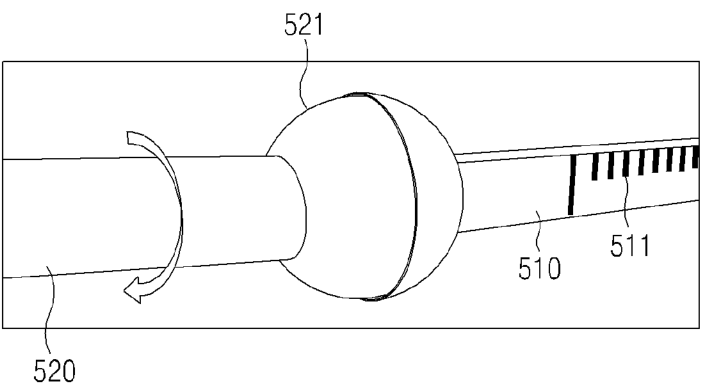
FIG. 6 is an enlarged view of A in FIG. 5.

FIG. 6 is an enlarged view of A in FIG. 5.

Referring to FIG. 6, the assembly type rod 500 according to an embodiment may have the bite rod 510 and the extension parts 520 coupled in a ball & socket form.

For example, the coupling part 521, configured at the end of the extension part 520, has a form such as a rounded ball, and is partially received at the end of the bite rod 510. The coupling parts 521 of the extension parts 520 may be inserted into the bite rod 510 in the ball & socket form. The extension parts 520 may be rotated from the bite rod 510 and thus matched and fixed to the Camper's lines on both sides. In this case, the end of the bite rod 510 may be in the form of an empty hemisphere to receive the end of the extension part 520 having a ball form.

For another example, the ends of the extension parts 520 may be configured the coupling parts 521 in the form of empty hemisphere to receive the end of the bite rod 510. The bite rod 510 is connected with the coupling parts 521 of the extension parts 520 in the ball & socket form, and the extension parts 520 may be rotated from the bite rod 510. Accordingly, the extension parts 520 may be fixed along the Camper's lines on both sides.

Figure 7:
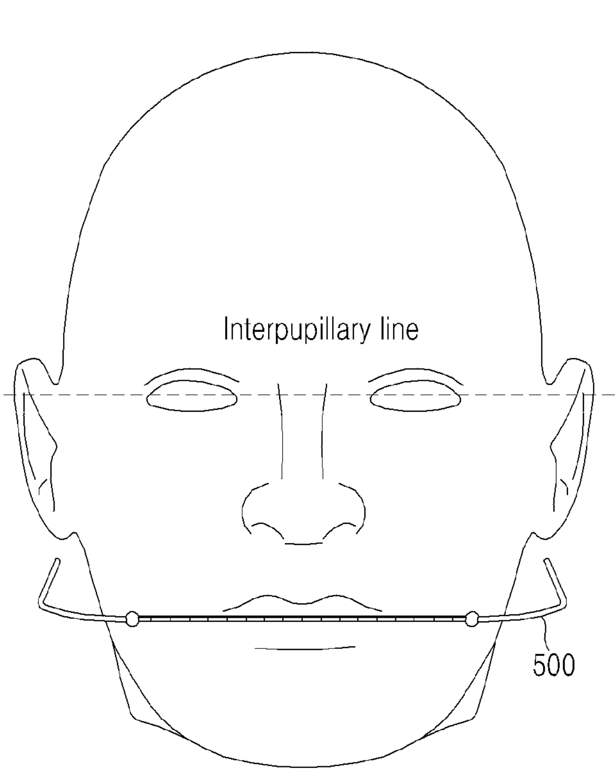
FIG. 7 is a frontal view Illustrating the state in which the assembly type rod according to an embodiment has been worn.
Figure 8:
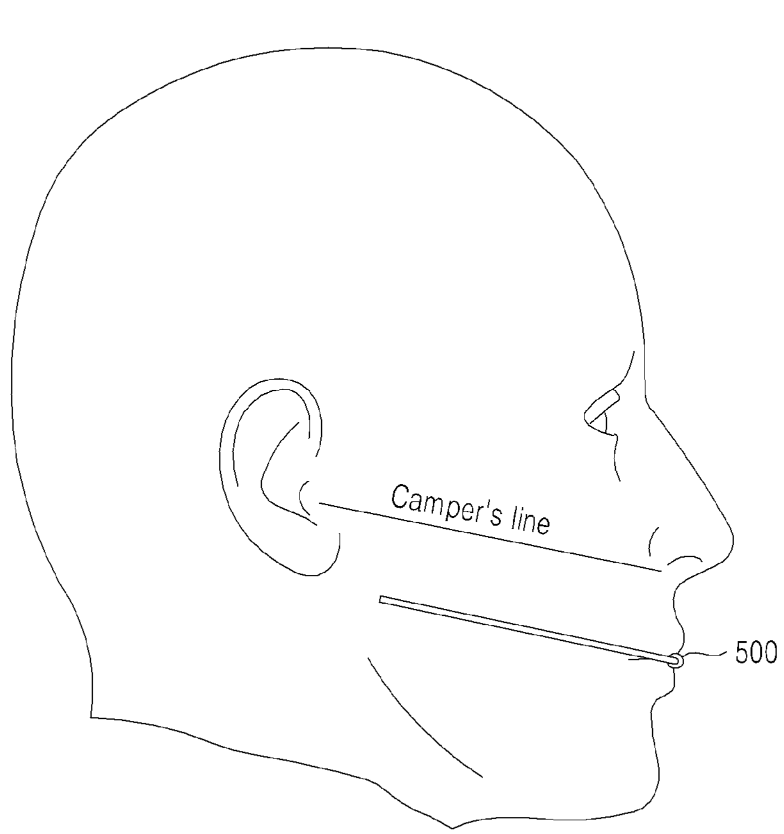
FIG. 8 is a lateral view illustrating the state in which the assembly type rod according to an embodiment has been worn.

FIG. 7 is a frontal view illustrating the state in which the assembly type rod according to an embodiment has been worn, FIG. 8 is a lateral view illustrating the state in which the assembly type rod according to an embodiment has been worn.

As illustrated in FIG. 7, a user (patient) may place the middle part of the bite rod of the assembly type rod between the maxillary and mandibular anterior teeth of the user, and may obtain information on the frontal occlusal plane parallel to an interpupillary line.

Furthermore, as illustrated in FIG. 8, the extension parts may be rotated in the state in which they are coupled to the bite rod through the ball-shaped coupling parts of the extension parts in a ball & socket form. Accordingly, information on the lateral occlusal plane can be obtained based on the Camper's lines on both sides.

Figure 9:
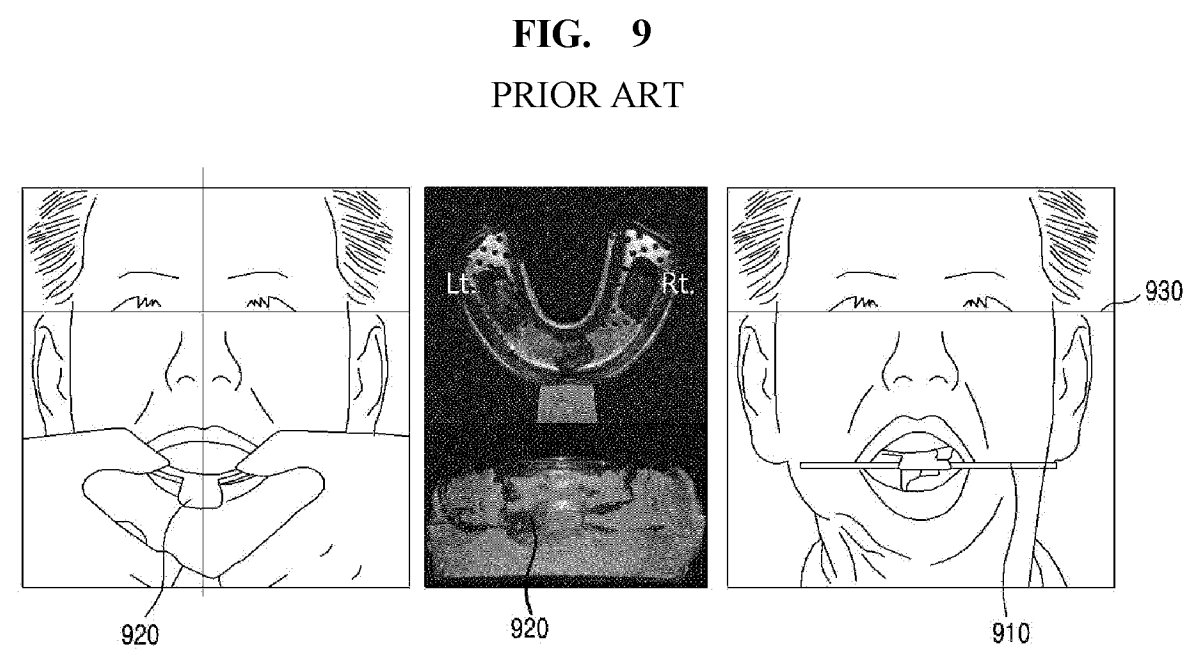

FIG. 9 is a diagram for describing an assembly type rod coupled to an impression tray according to an embodiment.

Referring to FIG. 9, By attaching an assembly type rod to the mandibular impression metal device (tray) 920, information on the occlusal plane parallel to the interpupillary line 930 can be obtained at the same time as the impression is taken. In a conventional technology, when impression taking, methods of providing such information are not proposed, Therefore, since the stone model produced after taking the impression was randomly trimmed without considering the occlusal plane, it was highly likely to provide incorrect information different from the actual oral environment of the patient.

In this case, only the bite rod 910 in which extension parts are not configured is illustrated. In such a case, information on the frontal occlusal plane parallel to the interpupillary line 930 can be obtained, but Camper's lines of lateral occlusal plane, cannot be taken.

Accordingly, in order to obtain information of the Camper's lines, the extension parts 520 described with reference to FIG. 5 may be coupled to both ends of the bite rod 910.

Figure 10:
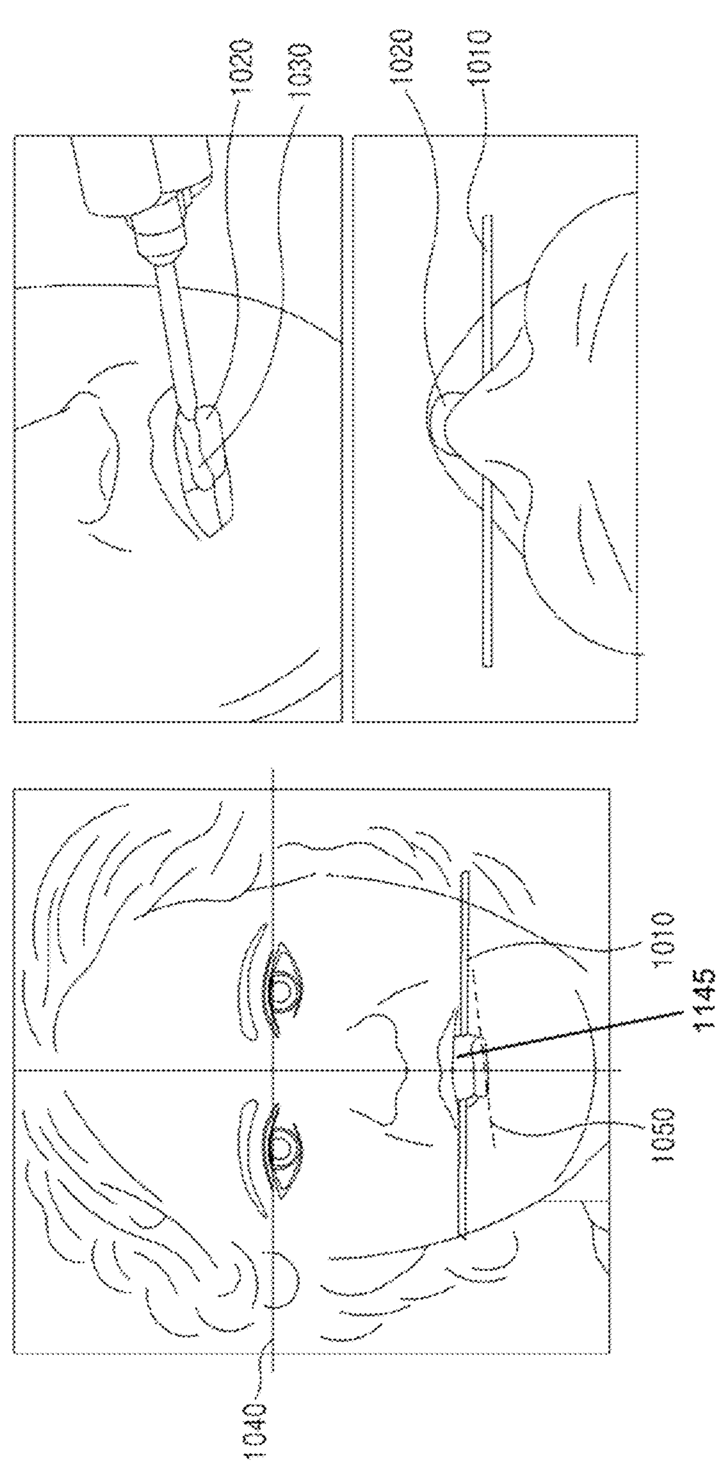
FIG. 10 is a diagram for describing an assembly type rod coupled to an upper customized resin Impression tray according to an embodiment.

FIG. 10 is a diagram for describing an assembly type rod attached to a maxillary individual impression tray according to an embodiment.

Referring to FIG. 10, the assembly type rod according to an embodiment may include a bite rod 1010 coupled to a bite part 1020 through a silicon taking material 1030. The bite part 1020 is coupled to the bite rod 1010, and is seated and fixed on the user's anterior teeth.

For example, the bite part 1020 has a "L"-shaped form having the outside opened, and the bite rod 1010 may be inserted and fixed to the bite part 1020 through the opened portion. Furthermore, the bite rod 1010 includes an adhesion part 1145 in which adhesives are coated on a middle part, and may be inserted and fixed to the opened portion of the bite part through the adhesives molten by applying heat.

Even if a individual impression tray is fabricated in a patient-customized form, if direction of the tray handle is misaligned during impression taking, a serious error may occur in the fabrication of a model because Information 1050 on an incorrect occlusal plane is delivered. In this case, if the bite rod 1010 is attached to tray handle in parallel to an interpupillary line 1040, an error in the fabrication of the prosthesis can be reduced because information on a correct occlusal plane is directly delivered to a dental technician.

In this case, only the bite rod 1010 without the extension parts is illustrated. In such a case, the interpupillary line 1040, frontal reference of occlusal plane, can be taken, but a lateral element cannot be obtained. Accordingly, in order to obtain information on Camper's lines, the extension parts 520 illustrated in FIG. 5 may be coupled to both ends of the bite rod 1010, According to embodiments, in particular, placing the assembly type rod parallel to the interpupillary line on the impression tray in the step of taking an impression makes it possible to produce a model including information on the occlusal plane.

Figure 11:
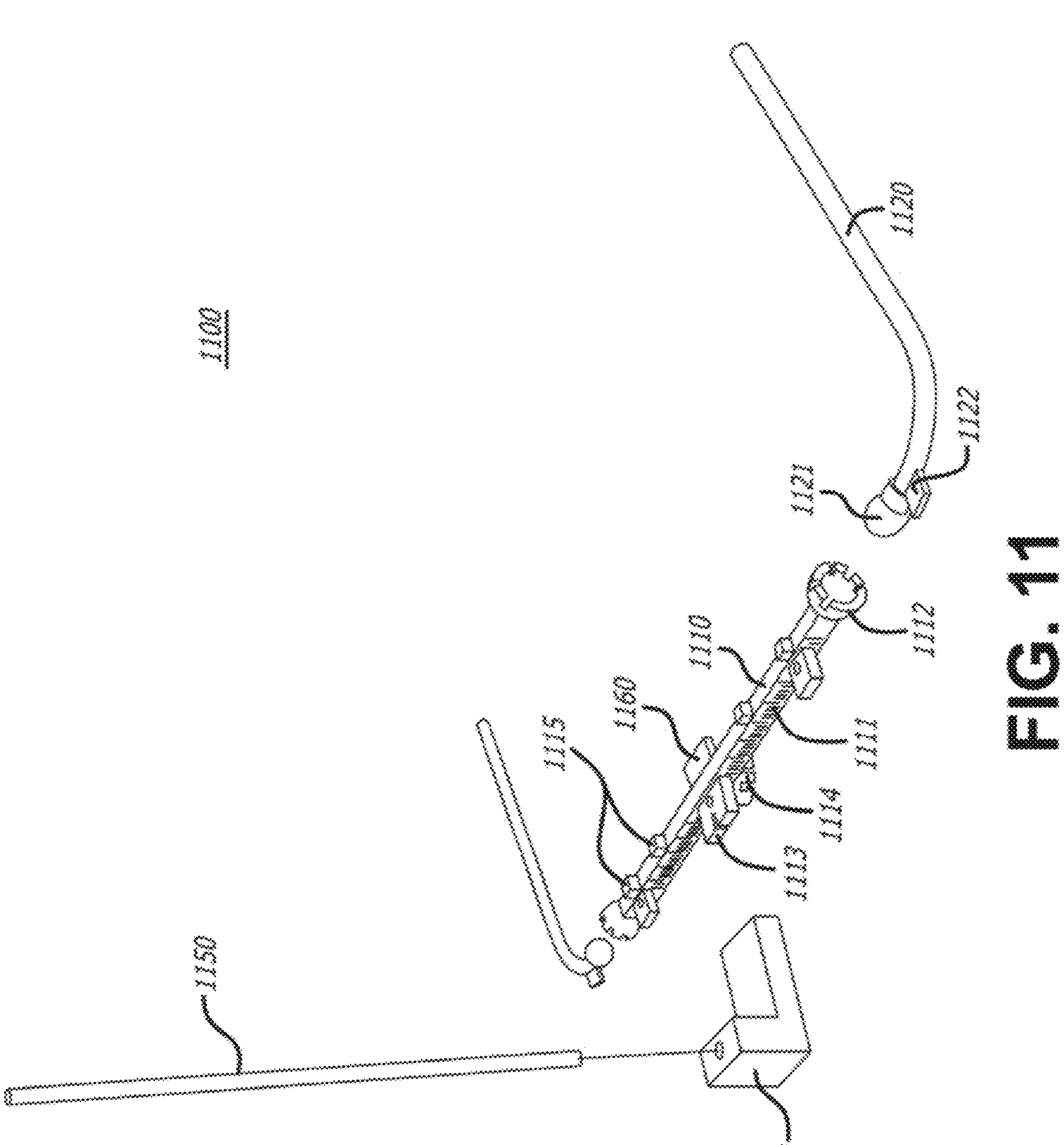
FIG. 11 is an exploded perspective view illustrating an assembly type rod according to another embodiment.
Figure 12:
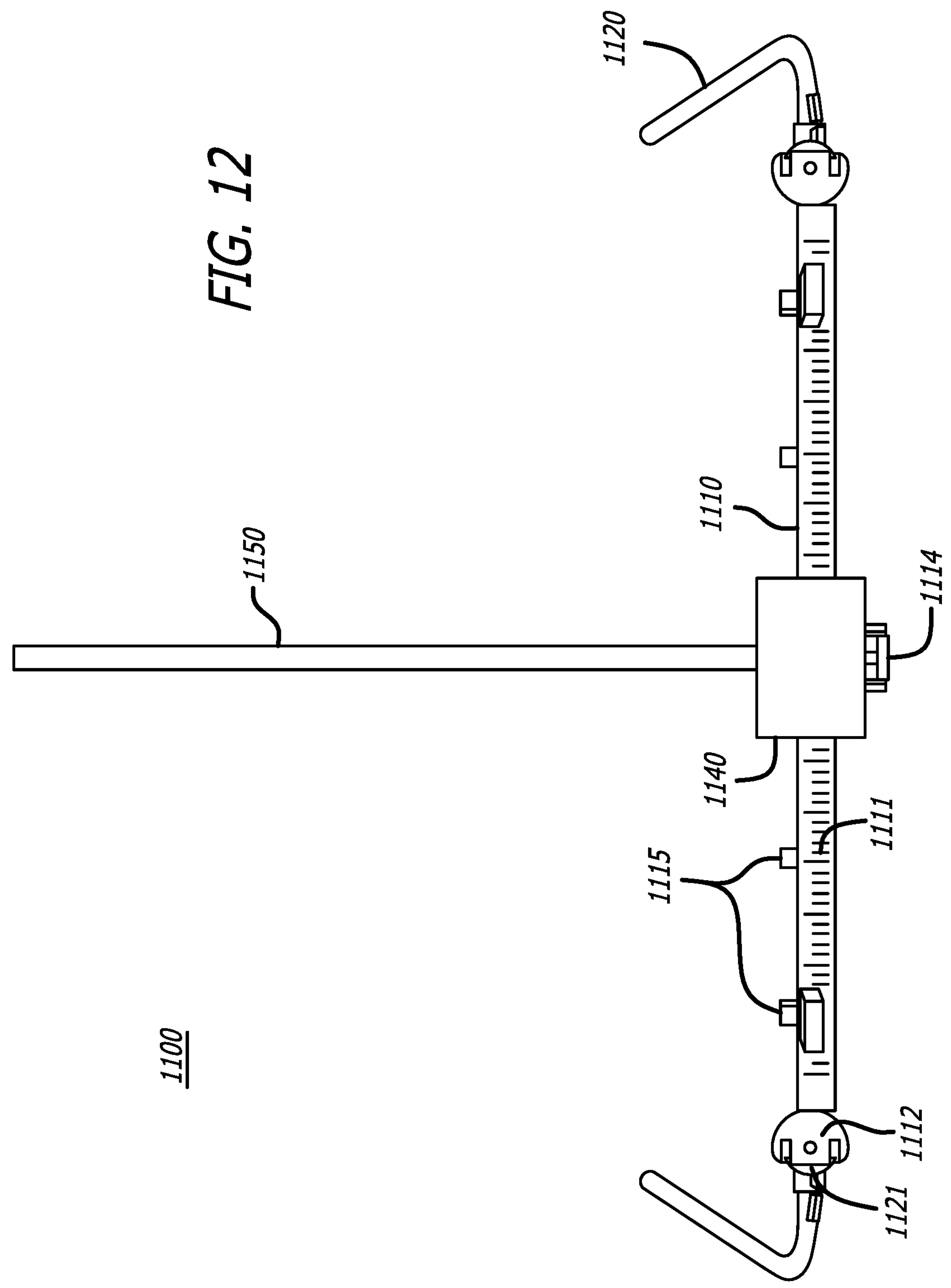
FIG. 12 is a diagram Illustrating the assembly type rod according to another embodiment.
Figure 13:
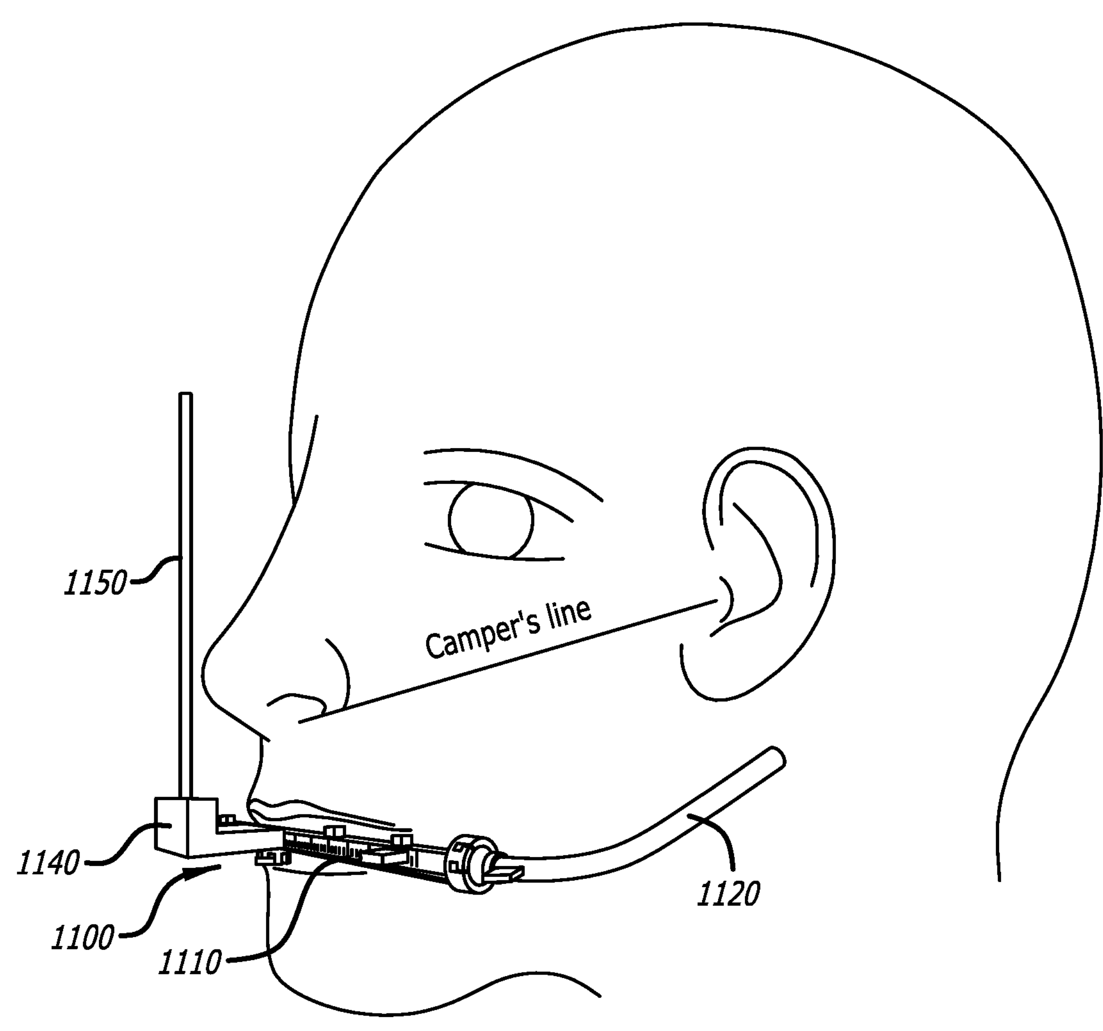
FIG. 13 is a diagram illustrating a lateral view for describing the wearing of the assembly type rod according to another embodiment.
Figure 14:
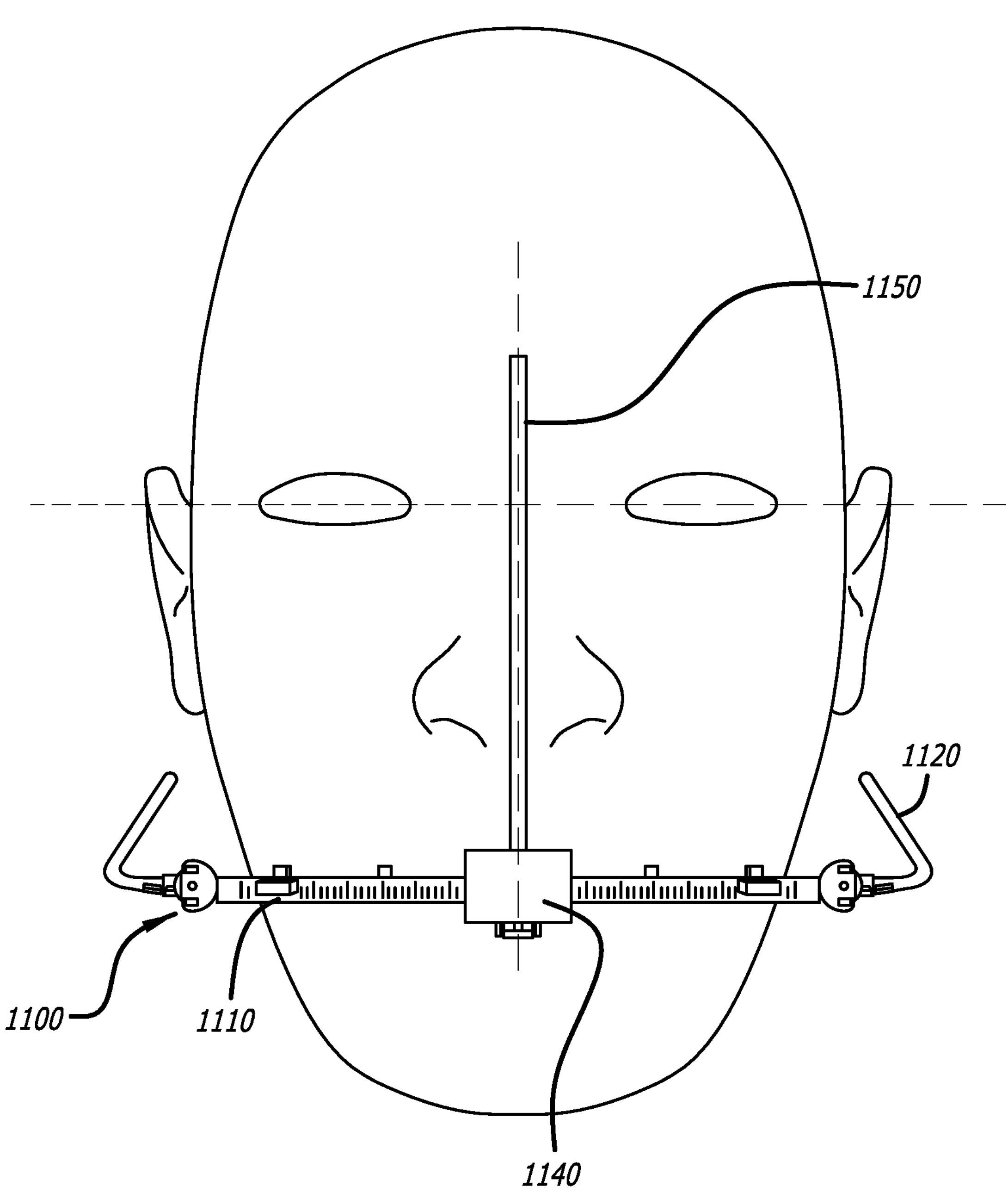
FIG. 14 is a diagram illustrating a frontal view for describing the wearing of the assembly type rod according to another embodiment.

FIG. 11 is an exploded perspective view illustrating an assembly type rod according to another embodiment. FIG. 12 is a diagram illustrating the assembly type rod according to another embodiment. Furthermore, FIG. 13 is a diagram illustrating a lateral view for describing the wearing of the assembly type rod according to another embodiment. FIG. 14 is a diagram Illustrating a frontal view for describing the wearing of the assembly type rod according to another embodiment.

Referring to FIGS. 11 to 14, the assembly type rod 1100 according to another embodiment may include a bite rod 1110. Furthermore, according to an embodiment, the assembly type rod 1100 may further include extension parts 1120, an indicating box 1140 and a bite part 1160. In this case, the assembly type rod 1100 according to another embodiment may include the assembly type rod 500 and the elements of the assembly type rod 500 according to an embodiment previously described.

The assembly type rod 1100 is disposed in front of a user and may include the bite rod 1110 in which a middle part is placed between the maxillary and mandibular anterior teeth of the user in order to obtain information on the midline, the symmetry of arches, and frontal occlusal plane parallel to the interpupillary line.

A shape of the bite rod 1110 is not limited, but the size of the bite rod 1110 may have a horizontal length similar to the face a state positioned in the anterior teeth of the user. A frontal occlusal plane may be measured by obtaining plane information parallel to the interpupillary line of the user through the bite rod 1110, The bite rod 1110 is coupled to a maxillary tray or mandibular tray, and may simultaneously measure an occlusal plane with impression taking. At this time, the bite rod 1110 may be connected to the tray through a tray connector 1114 under the middle part of the bite rod 1110. In this case, an error for fabricating a subsequent prosthesis can be reduced because a model in which a correct occlusal plane has been reproduced can be fabricated.

Furthermore, the bite rod 1110 may further include a scale part 1111. When a fixed or removable prosthesis (denture) is fabricated, the anatomical criteria for setting a form and length of teeth can be easily checked through the scale part 1111. Furthermore, the bite rod 1110 may further include markers 1115 for digital superimposing process.

The assembly type rod 1100 may further include the bite part 1160. The bite part 1160 is placed at the back of the middle part of the bite rod 1110, and may be configured to seat and fix at anterior teeth of a user when a silicon bite material is used.

The assembly type rod 1100 may further include the indicating box 1140. The indicating box 1140 has a "L"-shaped form, and may be inserted and fixed to a coupling plate 1113 configured in the middle part of the bite rod 1110. Meanwhile, a stick part 1150 may be coupled to the upper part of the indicating box 1140 in order to indicate a midline of face. Accordingly, even a frontal occlusal plane, a midline of face, and the symmetry of arches can be checked using the bite rod 1110. An error with an actual oral environment can be reduced because information on a three-dimensional plane is provided when a model is mounted on the articulator.

Furthermore, the assembly type rod 1100 may further include the extension parts 1120 coupled to both ends of the bite rod 1110. The extension parts 1120 are disposed in the lateral side of the user and are configured in plural number, and may be coupled to both ends of the bite rod 1110, The extension parts 1120 may be adjusted parallel to a Camper's line that connects the ala of nose and tragus of the user. That is, the two extension parts 1120 are placed each other parallel in the direction of a line that connects the ala of nose and tragus of ears on both sides, so that information on the Camper's lines can be obtained. Furthermore, the extension parts 1120 may further include markers 1122 for digital superimposing.

The extension part 1120 includes a ball-shaped coupling part 1121, and may be coupled the bite rod 1110 through the ball-shaped coupling part 1121 in a ball & socket form.

For example, the coupling part 1121 which has a form, such as a round ball, and is at least partially received in the end 1112 of the bite rod 1110, may be configured at the end of the extension part 1120. The coupling part 1121 of the extension part 1120 may be inserted into the end 1112 of the bite rod 1110 in the ball & socket form. The extension part 1120 may be rotated from the bite rod 1110 and may be fixed to the Camper's lines on both sides. At this time, the ends 1112 of the bite rod 1110 may be in the form of an empty hemisphere to receive the coupling part 1121, that is, the end of the extension part 1120 having the ball form. In this case, an angle is indicated at the end 1112 of the bite rod 1110 in a scale form, so information on a lateral occlusal plane can be delivered.

For another example, the ends of the extension part 1120 may be configured the coupling part 1121 in the form of empty hemisphere to receive the end 1112 of the bite rod 1110. The bite rod 1110 may be inserted into the coupling parts 1121 of the extension parts 1120 in the ball & socket form. The extension parts 1120 may be rotated from the bite rod 1110. Accordingly, the extension parts 1120 can be matched and fixed along to the Camper's lines on both sides.

Accordingly, the extension parts 1120 may be rotated in the state in which they have been coupled to the bite rod 1110, and may be matched and fixed to the Camper's lines on both sides. In this case, the bite rod 1110 may be coupled to or separated from the extension parts 1120 through the coupling parts 1121. That is, after the bite rod 1110 is separated from the extension parts 1120, only the bite rod 1110 may be used.

Even the Camper's line of a posterior teeth occlusal plane can be reproduced through very simple devices to be attached to both sides of the bite rod 1110. Accordingly, the assembly type rod 1100 according to embodiments can replace the conventional face bow in an economical and easy method. Because the assembly type rod can provide four-dimensional information of patient, including an inter-pupillary line of frontal view, Camper's lines of lateral view, a midline of face, and the symmetry of arches.

As described above, embodiments show that the occlusal plane is transferring at the same time as the Impression taking without expensive equipment and an inconvenient additional work using the assembly type occlusal rod device to improve a complicated clinical technique or an inconvenient bite taking method.

If the assembly type rod according to an embodiment is commercialized, information on an occlusal plane can be obtained very simply and conveniently simultaneously with impression taking. Furthermore, the assembly type rod is a simple device, it can be used universally in dental clinic.

When it is described that one component is "connected" or "coupled" to the other component, it should be understood that one component may be directly connected or coupled to the other component, but a third component may exist between the two components. In contrast, when it is described that one component is "directly connected" or "directly coupled" to the other component, it should be understood that a third component does not exist between the two components.

Terms used in this specification are used to merely describe a specific embodiment and are not intended to restrict the present disclosure. An expression of the singular number includes an expression of the plural number unless clearly defined otherwise in the context. Furthermore, in the present disclosure, it is to be understood that a term, such as "include" or "have", is intended to designate that a characteristic, a number, a step, an operation, a component, a part or a combination of them described in the specification is present, and does not exclude the presence or addition possibility of one or more other characteristics, numbers, steps, operations, components, parts, or combinations of them in advance.

Terms, such as "a first" and "a second", may be used to describe various elements, but the elements should not be restricted by the terms. The terms are used to only distinguish one element from the other element.

Furthermore, the term " . . . unit" or "module" described in the specification means a unit for processing at least one function or operation, and the unit may be implemented by hardware or software or a combination of hardware and software.

Furthermore, a component of the embodiment described with reference to each drawing is not limitedly applied to only a corresponding embodiment, and may be implemented to be Included in another embodiment without departing from the technical spirit of the present disclosure. Furthermore, it is evident that although a separate description is omitted, a plurality of embodiments may be implemented as an integrated single embodiment again.

Furthermore, in the description given with reference to the accompanying drawings, the same component is assigned the same or related reference numeral regardless of a drawing number, and a redundant description thereof is omitted. In describing the present disclosure, a detailed description of the known functions and constructions will be omitted if it is deemed to make the gist of the present disclosure unnecessarily vague.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents.

The invention claimed is:

1. A single U-shaped assembly rod, comprising:

a front bite rod, wherein a middle part of the front bite rod is configured to be placed between maxillary and mandibular anterior teeth of a user in order to obtain a midline, a symmetry of arches and information of a frontal plane parallel to an interpupillary line, wherein scale markings are marked on the front bite rod enabling a length of anatomical references to be checked when a fixed or removable prosthesis is fabricated, wherein an occlusal plane is measured by obtaining information of the frontal plane parallel to the interpupillary line of the user through the front bite rod, a tray connector configured to be connected to a tray, wherein the tray connector is located under the middle part of the front bite rod, and two extension parts, wherein an end of one of the extension parts is coupled to one end of the front bite rod and an end of the other extension part is coupled to another end of the bite rod such that the two extension parts and the front bite rod form the single U-shaped assembly rod and the two extension parts extend in parallel to a line configured to connect the user's ala of nose and middles of ears on both sides of the user in order to obtain information on Camper's lines, wherein each of the extension parts include ball-shaped coupling parts respectively coupled to the front bite rod, thereby each of the extension parts is independently pivotable and rotatable with respect to the front bite rod, respectively, and wherein each of the extension parts is pivotable and rotatable when connected with the bite rod so that each of the extension parts can be adjusted and fixed in parallel with the Camper's line on both lateral sides, and thereby the extension part is configured to measure a lateral occlusal plane, wherein the extension parts further comprise markers configured for digitally superimposing, wherein the one end of the front bite rod and the other end of the front bite rod each comprise an empty hemisphere configured to receive the ball-shaped coupling parts.

2. The single U-shaped assembly rod of claim 1, wherein the front bite rod is coupled to a maxillary tray or a mandibular tray with the tray connector and measures the occlusal plane simultaneously with impression taking.

3. The single U-shaped assembly rod of claim 1, further including an indicating box of a "L"-shaped form inserted and fixed to a coupling plate configured in the middle part of the front bite rod, wherein a stick part coupled to an upper end of the indicating box indicates a midline.

4. The single U-shaped assembly rod of claim 1, further including a bite part coupled to the front bite rod and configured to be seated and fixed to anterior teeth of the user.

* * * * *